Figure 1:
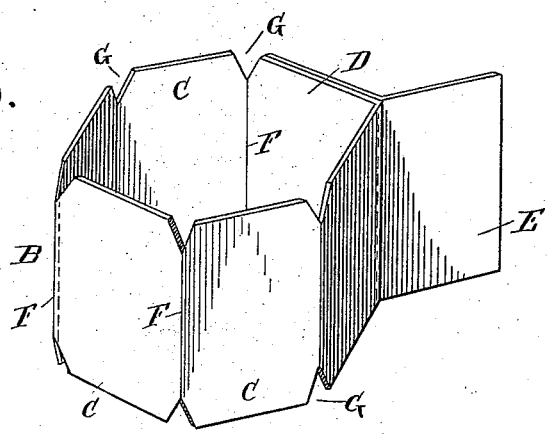

(No Model.)

B. LEONARD.
FRUIT WRAPPING DEVICE.

No. 528,906. Patented Nov. 6, 1894.

Witnesses.
J. C. Monteverde.
Peter J. Bourdette.

Inventor.
Benjamin Leonard.

UNITED STATES PATENT OFFICE.

BENJAMIN LEONARD, OF SACRAMENTO, ASSIGNOR OF ONE-HALF TO CHARLES W. WESTON, OF SAN FRANCISCO, CALIFORNIA.

FRUIT-WRAPPING DEVICE.

SPECIFICATION forming part of Letters Patent No. 528,906, dated November 6, 1894.

Application filed April 20, 1894. Serial No. 508,361. (No model.)

*To all whom it may concern:*

Be it known that I, BENJAMIN LEONARD, of Sacramento, county of Sacramento, and State of California, have invented a certain new and useful Improvement in Fruit-Wrapping Devices, of which the following is a specification.

My invention relates to improvements in fruit wrapping by providing a separate ventilated wrapper for each specimen of fruit, so that it may be kept from coming in contact with other specimens in the same box or case in which the fruit is packed, for marketing or storage purposes. Fruit in this ventilated wrapper is preserved dry and in a good condition for use for a long time, and the tendency to mold or decay is almost wholly obviated. The wrapper is provided with ventilating holes or cuts, made, at or near the top and bottom, or in any part as may be desired; so that no moisture can collect and be retained upon the fruit, as it is all carried off by evaporation through the ventilation provided.

My invention for fruit wrapping consists of a length of stiff paper, or thin wood veneer, or other material, jointed or bent into eight sections or divisions, more or less, as may be required for use. When the lengths of material are jointed or divided off into eight sections, or divisions, and the ends are brought together so that the first division laps upon the seventh (which sections or divisions may be fastened together, or not, according to convenience for use), then there is formed a wrapper having six sides (hexagonal shape) into which the fruit specimens may be deposited, the eighth or extra division, or flap, being allowed to stand out at right angles with the wrapper so formed, and a single fruit specimen is placed on each side of it, fitting in between the meeting joints of the wrappers to which the flap standing at right angles is united. A row of these wrappers with the fruit therein, may be thus arranged on one side of a box or case, leaving a division, or flap thus standing out at right angles from each wrapper. In packing, the wrapper is placed in the hand and the fruit is placed inside of it, and then the wrapper with the fruit inclosed is packed in position in the box. For convenience, the opposite side of the box or case may be elevated, so as to give to it such an incline or pitch, as will settle the wrappers with the fruit therein, against the lower side of the box, thus holding them compactly in place, as the wrappers with the fruit therein are placed in position.

Against the upright edge of the outstanding section or flap of the wrapper, a second row of wrappers is placed, in the same order as the first row; and when thus arranged they form with the said section or flap, standing out from each wrapper to which it is attached, spaces of the same shape as the others, inclosing the fruit already in position, as above described; and thus every other row of fruit is packed, every other row of wrappers forming with the outstanding section, or flap of the other row, placed in position, wrappers complete in every way, and of the same hexagonal shape, for retaining fruit therein. When the bottom space of the box or case is thus filled with the wrappers containing fruit, a sheet of stiff paper, wood veneer or other material provided with openings for ventilation, may be placed over the top of the layer of wrappers and fruit thus packed; and on the surface of said covering another layer of wrappers containing fruit may be filled in, and this layer may be covered in like manner as the first; and so the packing may proceed with as many layers of wrappers and fruit as may be practicable, or desirable for marketing or storage purposes.

This method of packing fruit insures its successful handling and preservation for all purposes, and is far superior to any other arrangement or device that has ever been used, as it provides a separate ventilated wrapper for each specimen of fruit by itself, where it is held firmly in place, so that it cannot come in contact with other fruit pieces. The ventilation may be made by any openings formed in any part of the wrapper for that purpose, or by the use of corrugations in the material used. The sheets separating the layers may also have openings of any kind made in them for further ventilation.

The shape of the wrapper may be round, six-sided, or many sided as may be desirable.

The wrapper is adapted to fit any size of box or case, and may be packed tightly so as to prevent rubbing, bruising or displacement of the fruit; and it is also adapted to variation for different sizes of the same. This wrapper also displays fruit to the best advantage when packed in a box. If the wrapper is fastened together, whatever amount of fruit may be taken from the box, that which remains retains its place securely packed. The outstanding section or flap on the wrapper saves material, in the use that is made of it, in the formation of packing spaces. I attain these objects by the mechanism illustrated in the following drawings.

Figure 2:
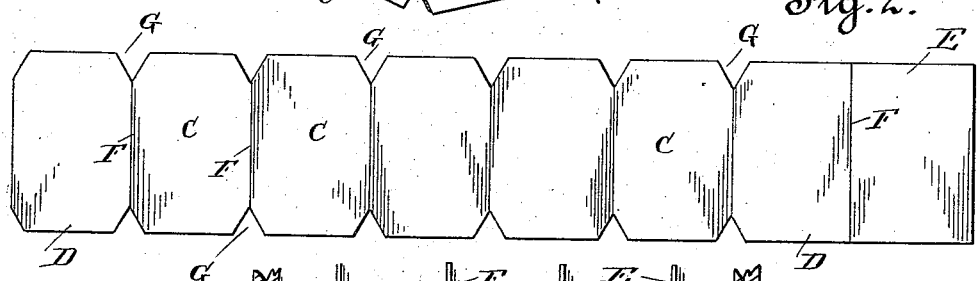
Figure 3:
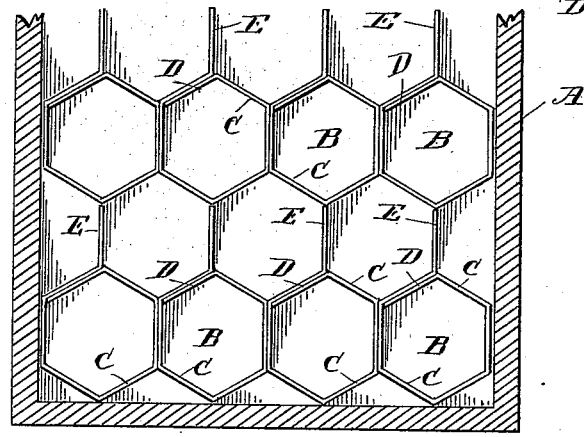
Figure 4:
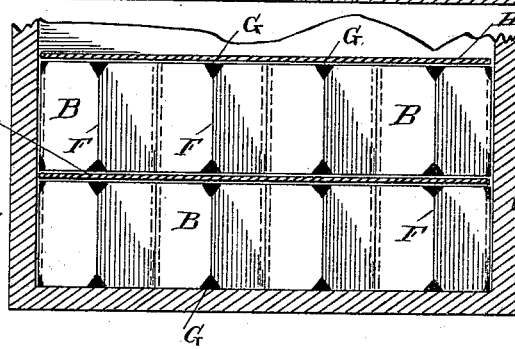

Figure 1 is a perspective view of packing wrapper; Fig. 2, a plan development of the same; Fig. 3, a plan of box partly broken, showing arrangement of wrapper when packed in a box; Fig. 4, a side elevation partly broken of same, showing partition sheets between the layers and wrappers as packed with fruit.

A represents the box; B, the wrapper in position as set up; C, the jointed sections of the wrapper; D, the overlapping parts of the same; E, the flap or outstanding section of wrapper; F, the broken joints in the wrapping material; G, the openings or cuts in the sections at the top and the bottom of the wrapper for ventilation; H, sheets separating the layers of wrappers with fruit.

What I claim as my invention, and desire to secure by Letters Patent of the United States, is—

1. A device for separate fruit packing, consisting of the combination of the separate wrapper, B, made of thick paper or wood veneer or other material, jointed in sections, provided with openings, G, for ventilation; the divisions or sections, C; the overlapping parts, D, as brought together to form the wrapper; the flap or outstanding section, E; the broken joints, F; the sheets, H, made of paper, wood veneer, or other material, separating the layers of wrappers with fruit therein, and for forming the foundation upon which another layer of fruit may be packed; and the box, A, in which the wrappers with fruit are packed,—substantially as herein described and set forth.

2. In a separate fruit wrapper, the combination of the wrapper, B; provided with the openings, G, for ventilation the jointed sections, C; the overlapping parts, D, and the broken joints, F; with the flap, or outstanding section, E; the sheets, H, separating the layers of wrappers with fruit therein; and the packing box, A, for packing the wrappers with fruit therein,—substantially as herein described and set forth.

3. In a separate fruit wrapper, the combination of the packing-box, A; the wrapper, B; provided with the openings, G, for ventilation the sections, C; the overlapping parts, D; and the broken joints, F; the flap or outstanding sections, E; with the sheets, H, separating the layers of wrappers with fruit therein,—substantially as herein described and set forth.

4. In a separate fruit wrapper, the combination of the packing-box, A; the wrapper, B, having broken joints, F; the sections, C; the overlapping parts, D; the opening, G, providing ventilation; the flap or outstanding section, E, with the sheets, H, separating the layers of wrappers with fruit therein,—substantially as herein described and set forth.

BENJAMIN LEONARD.

Witnesses:
PETER J. BOURDETTE,
JAMES T. BLOOMFIELD.